United States Patent [19]

Hadley et al.

[11] Patent Number: 5,283,470
[45] Date of Patent: Feb. 1, 1994

[54] HYBRID DRIVE SYSTEM WITH REGENERATION FOR MOTOR VEHICLES AND THE LIKE WITH A BRUSHLESS MOTOR

[75] Inventors: John W. B. Hadley, Huntington; Qianyi Jiang, Jackson Heights, both of N.Y.

[73] Assignee: Lauzun Corporation, Lloyd Harbor, N.Y.

[21] Appl. No.: 917,828

[22] Filed: Jul. 21, 1992

Related U.S. Application Data

[63] Continuation-in-part of Ser. No. 818,449, Dec. 30, 1991, which is a continuation of Ser. No. 651,712, Feb. 6, 1991, abandoned.

[51] Int. Cl.$^5$ .................... B60L 11/00; H02P 9/00
[52] U.S. Cl. .................... 290/45; 290/14; 290/16; 322/46; 322/47
[58] Field of Search .......... 290/14, 16, 45; 322/46, 322/47

[56] References Cited

U.S. PATENT DOCUMENTS

| | | |
|---|---|---|
| 3,566,717 | 3/1971 | Berman et al. |
| 3,650,345 | 3/1972 | Yardney |
| 4,006,398 | 2/1977 | Gritter ............ 322/47 |
| 4,305,254 | 12/1981 | Kawakatsu et al. |
| 4,306,156 | 12/1981 | Monaco et al. |
| 4,438,342 | 12/1981 | Kenyon |
| 4,592,090 | 5/1986 | Curl et al. |

FOREIGN PATENT DOCUMENTS

| | | |
|---|---|---|
| 1131422 | 10/1968 | |
| 1217748 | 12/1970 | United Kingdom |
| 1545201 | 5/1979 | United Kingdom |
| 2062379A | 5/1981 | United Kingdom |
| 2064896A | 6/1981 | United Kingdom |
| 2075289A | 11/1981 | United Kingdom |
| 2084820A | 4/1982 | United Kingdom |
| 2112233A | 7/1983 | United Kingdom |

OTHER PUBLICATIONS

Solectria Corporation, Motor and controller specifications, 1990.
Plug into the Future Powered by Pepco.

Primary Examiner—A. D. Pellinen
Assistant Examiner—Robert Lloyd Hoover
Attorney, Agent, or Firm—Kane, Dalsimer, Sullivan, Kurucz, Levy, Eisele & Richard

[57] ABSTRACT

A motor vehicle drive system includes a brushless motor driven by a battery and directly coupled to the vehicle wheels for providing primary motive power. During braking, the motor acts as a generator for recharging the battery. Preferably the recharging current is first allowed to build up by shunting the motor so that the regeneration may occur at both high and low speeds. The regenerative current period may be varied with the speed of the vehicle.

15 Claims, 5 Drawing Sheets

HYBRID DRIVE SYSTEM WITH REGENERATION FOR MOTOR VEHICLES AND THE LIKE WITH A BRUSHLESS MOTOR

This is a continuation-in-part application to application Ser. No. 07/818,449 filed Dec. 30, 1991, which is a continuation of application Ser. No. 07/651,712 filed on Feb. 6, 1991, now abandoned.

BACKGROUND OF THE INVENTION a. Field of Invention

This invention pertains to a hybrid power drive system for motor vehicles including an electric brushless motor as the primary mover, a battery and a generator for deriving electric power for the motor. Dynamic braking is used to recapture the dynamic energy of the motor vehicle.

b. Description of the Prior Art

Today the overwhelming majority of motor vehicles on the road rely on internal combustion engines as the primary mover. However, because of numerous environmental and economic factors, these types of motor vehicles are becoming more and more unacceptable. All electric motor vehicles using storage batteries as the only power source are environmentally and economically more acceptable. Nonetheless, despite extensive experimentation in this area, no such vehicles were developed which could provide the acceleration or the operating range that is provided by vehicles with internal combustion. As an intermediate solution, hybrid motor vehicles have been suggested with drive systems consisting of an electric motor which is used as a prime mover, a storage battery, and a generator for charging the battery, and to augment the battery. Systems of this type are disclosed in U.S. Pat. Nos. 4,292,531; 4,438,342; 4,547,678; 3,888,325; 4,042,056; 4,099,589. However, none of these proposed systems are acceptable because they rely on complicated circuitry and are not capable of performing the required switching of power between various modes in a satisfactory manner.

OBJECTIVES AND SUMMARY OF THE INVENTION

In view of the above-mentioned disadvantages of the prior art, it is an objective of the present invention to provide a power drive system for a hybrid motor vehicle wherein current from a battery is efficiently switched to a brushless motor to optimize the performance of the motor vehicle.

A further objective is to provide a vehicle with a drive system including dynamic braking whereby a substantial part of the kinetic energy of the vehicle is converted into electrical energy and stored into the batteries.

Yet another objective is to provide a system wherein the current for driving a motor is fed substantially from the battery, and wherein the battery is recharged while the vehicle is coasting.

Other objectives and advantages of the invention shall become apparent from the following description of the invention.

A hybrid motor vehicle constructed in accordance with this invention consists of storage battery which provides power to an electric motor through a CPU-based control circuit. The electric motor drives the wheels of the vehicle. The motor is operate in an actuating mode during acceleration and coasting, and a dynamic braking mode during which the motor acts as a current source to generate a charging current for the battery. Advantageously in the dynamic braking mode, the motor control circuit alternates between in current generating mode during which the motor is shunted to build up the charging current, and a battery charging mode during which the charging current flows through the battery. Preferably the motor is a brushless DC motor.

DETAILED DESCRIPTION OF THE INVENTION

Figure 1:
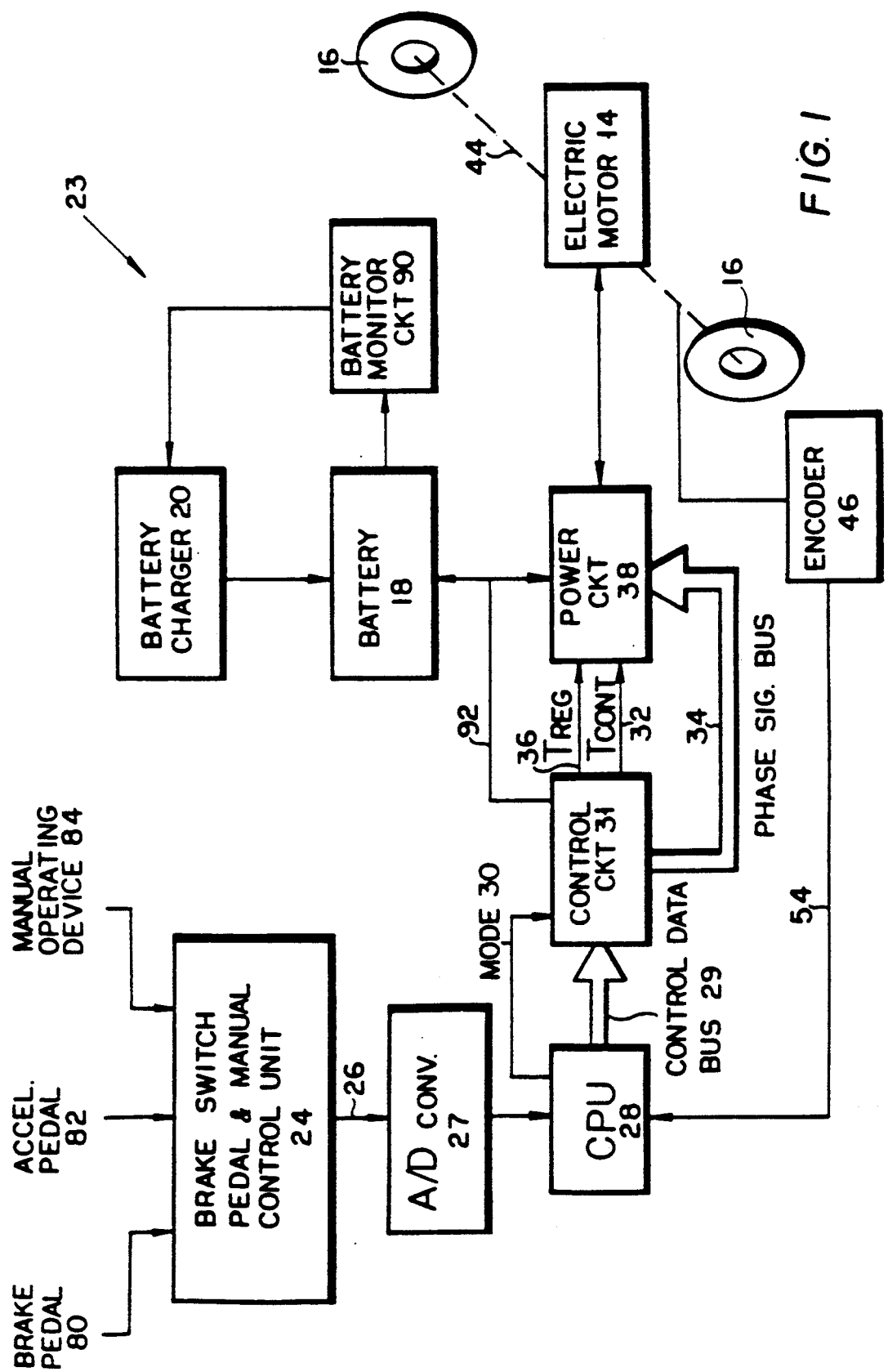
FIG. 1 shows a block diagram for the drive system.

As shown in more detail in FIG. 1, the drive system 23 for a motor vehicle includes a brake switch and manual control unit 24 which generates a signal indicative of the desired speed or a brake signal on line 26 to a CPU 28 through an A/D converter 27. The CPU 28 provides control data on line 29 and mode indication on line 30 to a control circuit 31. As described more fully below, the mode indication defines an actuation or a regeneration mode. The control data defines the requested speed for the motor. The control circuit controls power circuit 38 on lines 32, 34 and 36. Motor 14 is preferably a brushless DC motor having a power rating selected to conform to the size of motor vehicle. For example, for a typical passenger motor vehicle, motor 14 may be a 45 HP (peak) 300 VDC brushless motor such as one manufactured by Pacific Scientific Corp.

Motor 14 is coupled to the wheels 16 of the motor vehicle in a well known manner via a drive shaft 44. In addition, an encoder 46 is used to monitor the speed of rotation of the motor shaft 44. This encoder 46 generates a feedback signal on 54 for the CPU 28.

Power to motor 14 is provided by circuit 38 from a battery 18. During braking, the motor 14 acts like a generator to convert the kinetic energy of the motor vehicle to produce a current which is periodically fed to battery 18 for recharging. Battery 18 is also recharged through a standard battery charger 20 as described more fully below.

Figure 2A:
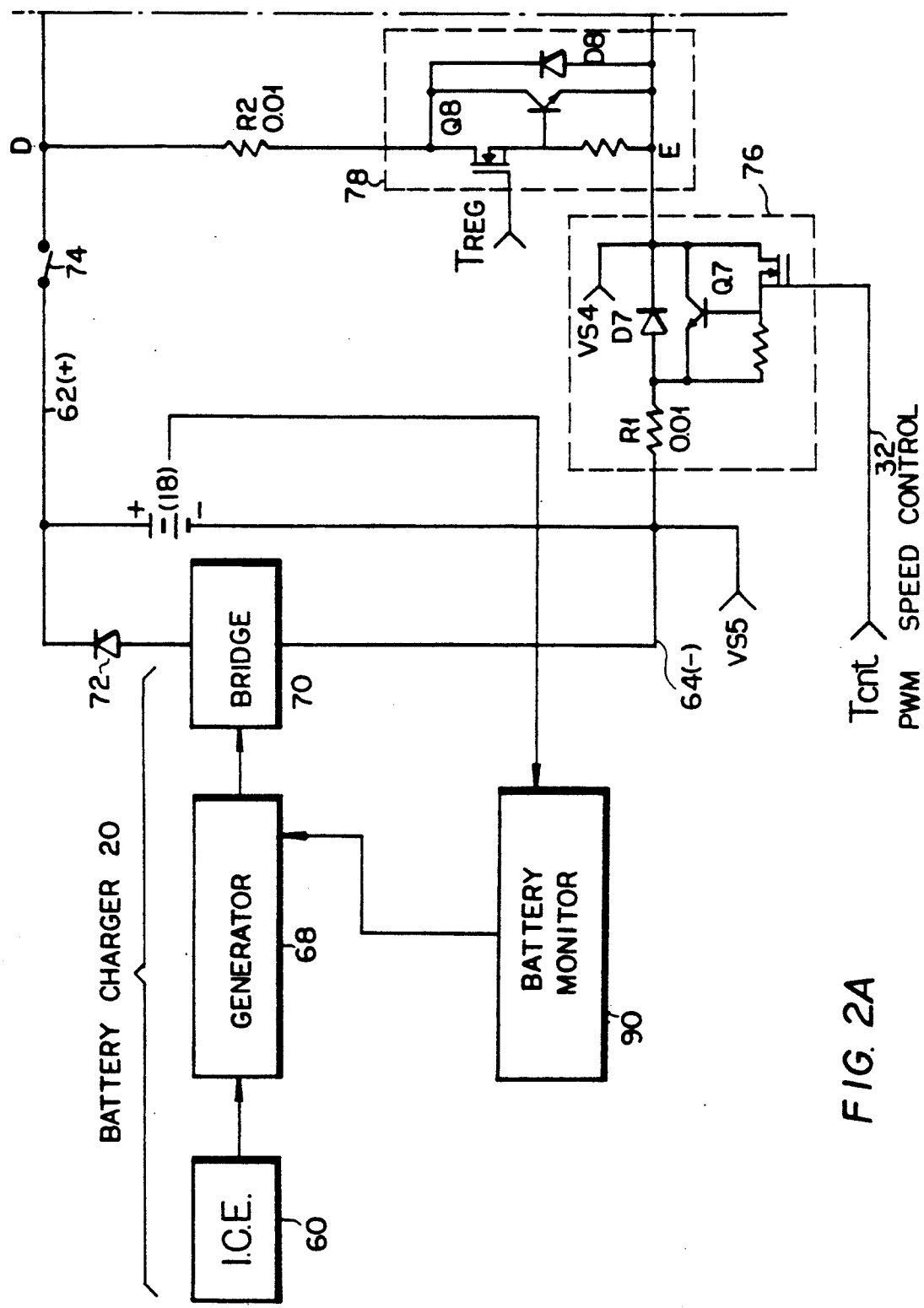
FIGS. 2A and 2B show a schematic diagram for the power circuit of FIG. 1.
Figure 2B:
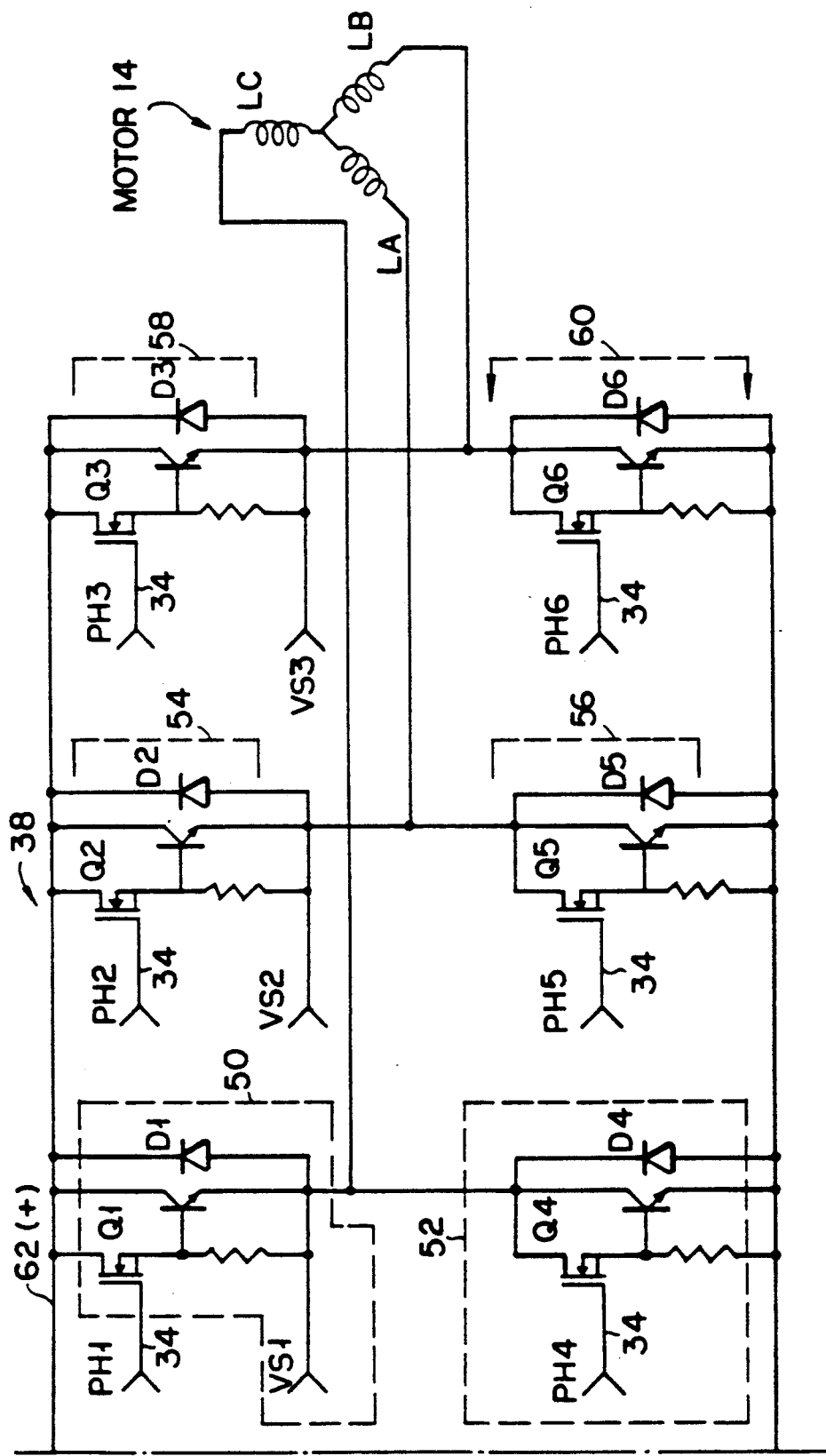

Referring now to FIGS. 2A and 2B, motor 14 is a three-phase brushless DC motor having three field coils LA, LB and LC connected in a Y-configuration. The motor also includes a permanent magnet rotor (not shown) cooperating with field coils LA, LB, LC to turn the motor when current is applied to said field coils.

The power to the coils is provided by the power circuit 38 including two power buses 62 (+) and 64 (−). More specifically, circuit 38 includes six semiconductor switches Q1-Q6 which selectively connect the field coils LA, LB, LC to the power buses 62 and 64 in accordance with the phase signals received on lines PH1-PH6, VS 1-VS4 from control circuit 31.

Each semiconductor switch consists of a combination of a MOSFET, a bipolar transistor and a diode. These three elements of each semiconductor switch are collectively referred to as a Bi-MOSFET. The semiconductor switches are activated in a well known pattern by the PH1-PH6, VS1-VS4 signals thereby forming a known power invertor for the motor 14.

Battery 18 which may have a nominal rating of 300 VDC and 40 amp-hours is connected to buses 62, 64 to provide primary power to the electrical motor 14.

As previously mentioned, the system is also provided with a standard battery charger 20 consisting of an internal combustion engine (I.C.E.) 60, generator 68 and rectifier bridge 70. The output of generator 68 of charger 20 is rectified by a bridge 70 and then coupled to a diode 72 to bus 62, and to bus 64.

Referring to FIG. 1, the control unit 24 receives inputs from a brake pedal 80 or an accelerator pedal 82. Alternatively, the control unit 24 may be receive a request for acceleration from a manual operating device 84. In response the control unit 24 generates an analog desired speed signal or brake signal on line 26. This signal is converted into a digital signal by A/D converter 27 and sent to CPU 28.

In response to a desired speed signal, the CPU 28 operates the motor 14 in an actuation mode during which the motor vehicle is either accelerating or essentially coasting at a constant speed. In this mode, the control signal TCNT on line 32 is pulsed and the signal TREG on line 36 is low. Therefore, FIG. 2A, electronic switch 76 is cyc'-d to turn on and off, while electronic switch 78 is always off. The signal pair TCNT-VS5 determines the motor turn on time using standard pulse width modulation thereby operating the motor 14 at the desired speed. The phase signal pairs PH1-VS1 to PH6-VS4 operate the motor 14 in the desired direction.

In response, to the application of brake pedal 80, CPU 28 switches to a brake mode. In this mode, the signal TCNT on line 32 and all the phase signals PH1-6 go low thereby turning electronic switches 50, 52, 54, 56, 58, 60 and 76 off. Therefore in the brake mode, current from battery 18 via bus 64 is cut off by switch 76. At the beginning of the brake mode, the signal TREG on line 36 from the control circuit 31 goes high for a period T1 (see FIG. 4) thereby turning electronic switch 78 on. As the vehicle continues to move and motor 14 continues to turn, the EMF generated by motor/generator 14 generates a current I1(t) which circulates through the diodes D1, D2 and D3, switch 78 and diodes D2, D4, D6. The equivalent circuit for this current generation period is shown in FIG. 3.

Figure 3:
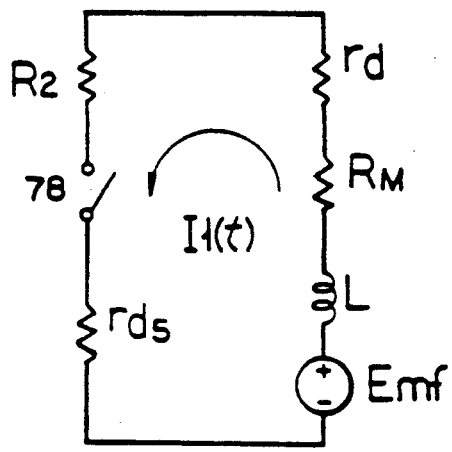
FIG. 3 shows an equivalent circuit for the charging current generation period.

In FIG. 3, rd is the equivalent resistances of the diodes D1-D6, RM and L are the resistance and inductance of the motor 14, rds is the resistance of switch 78, and the Emf voltage source represents the back Emf of the motor taken across points D and E in FIG. 2A. Current I1(t) increases exponentially toward a value $I\phi = EMF/RA$ where RA is the total series resistance of the circuit of FIG. 3, (i.e. is I1 (t)$=I\phi(1-e^{-RAt/L})$.

Importantly, the switch 78 during the brake mode is not on all the time but rather it is turned periodically on and off by the signal TREG, as indicated in FIG. 4. The On period, T1, is selected so that it is much shorter than the circuit time constant (L/RA) at which current I1 (t) rises so that for this period it may be approximated as a straight line reaching a maximum value I0=I1(T1).

During this current generation period, as the vehicle slows down, some of its kinetic energy is converted into electrical energy by the motor 14. This electrical energy WM1 is readily calculated using the formula:

$$WM1 = Emf \int_0^{T1} I1(t)dt.$$

A portion of this electrical energy, WRA is dissipated through resistance RA while the remaining energy WL is stored in inductance LM. In other words, WM1=WRA+WL where:

$$WRA = RA \int_0^{T1} I1^2(t)dt \text{ and}$$

$$WL = \tfrac{1}{2} LM\, I\phi^2.$$

Figure 5:
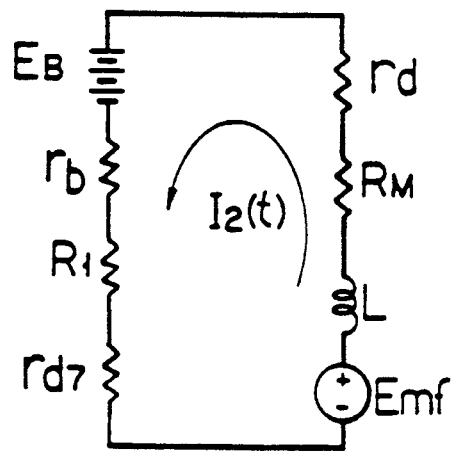
FIG. 5 shows an equivalent circuit for the battery charging period.

Current generator period T1, is followed by a battery charging period T2 (see FIG. 4) during which the signal TREG goes low and switch 78 is turned off forcing the motor current to flow through the battery 18 and D7, because motor current cannot change instantly. The equivalent circuit for period T2 is shown in FIG. 5 wherein rb represents the internal resistance of the battery, EB nominal voltage of the battery 18 and rd7 is the resistance of diode D7. The current through the circuit of FIG. 5, I2(t), is initially equal to the peak value of I1(t) (i.e. I0) and it decreases exponentially until it reaches zero, at time T3. In other words, current I2(t) cannot go negative because of the diodes D1-D7. Again T3 is much smaller than the time constant (L/RB) of circuit so that current I2(t) may be approximated as a straight line, as shown in FIG. 4. RB is the total series resistance of the circuit of FIG. 5. Time T2 is selected so that it is slightly larger than T3.

During this battery charging period T2, the energy generated by motor 14, WM2 can be calculated using the formula:

$$WM2 = Emf \int_0^{T3} I2(t)dt.$$

The current I2(t) stores energy into the battery 18 thereby recharging it. This energy is given by the formula:

$$Wb = Eb \int_0^{T3} I2(t)dt.$$

Figure 6:
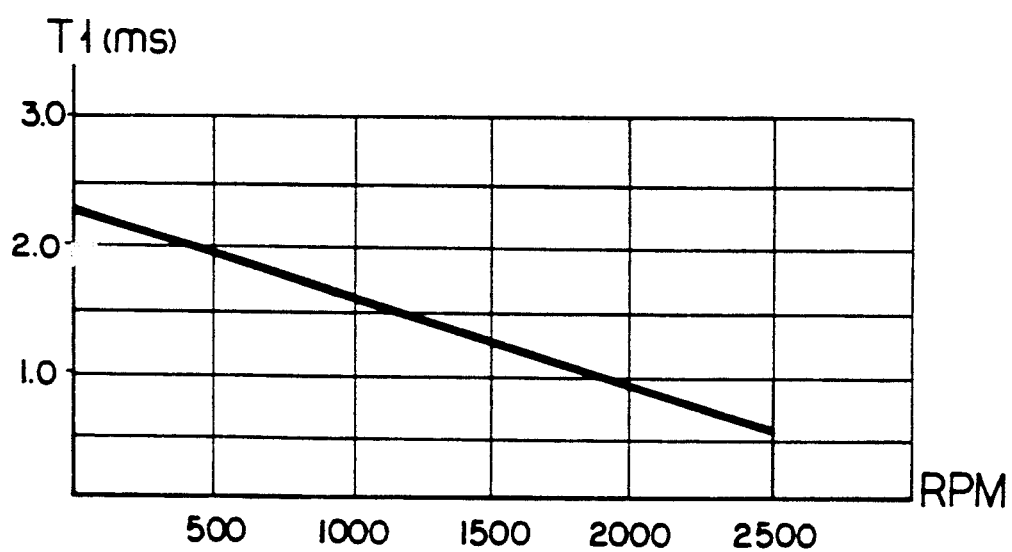
FIG. 6 shows a graph of the motor short circuit (i.e. the current generator period) as a function of motor speed.

In addition, some energy WRB is also dissipated through the resistance RB of the circuit of FIG. 6 in accordance with the formula:

$$WRB = RB \int_0^{T3} I2^2(t)dt.$$

Due to the law of conservation of energy, the energy dissipated through the resistance RB and stored in the battery must be equal to the energy generated by motor 14 during T2 plus the initial energy stored in the motor coils at the beginning of T2. In other words, $$WRB + Wb = WM2 + WL.$$

Since WL=WM1−WRA, the above formula can be rewritten as $$WM1 + WM2 = WRB + Wb + WRA$$

The regeneration efficiency Eff of the present system is given by:

$$Eff = WB/(WM1 + WM2)$$

Figure 4A:
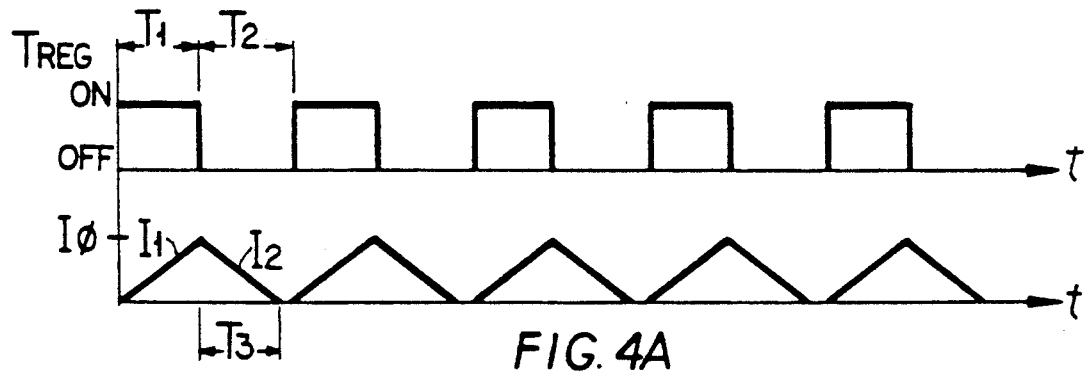
FIGS. 4A, 4B and 4C; shows a graph for the braking mode for the subject apparatus at various rotational speeds of the motor.
Figure 4B:
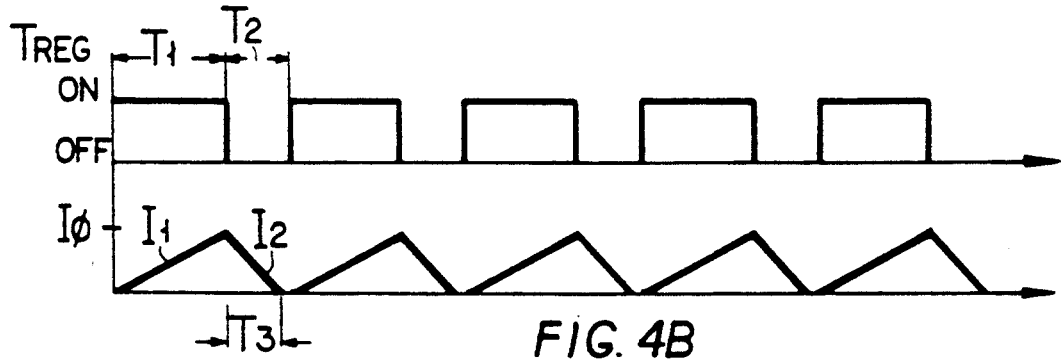
Figure 4C:
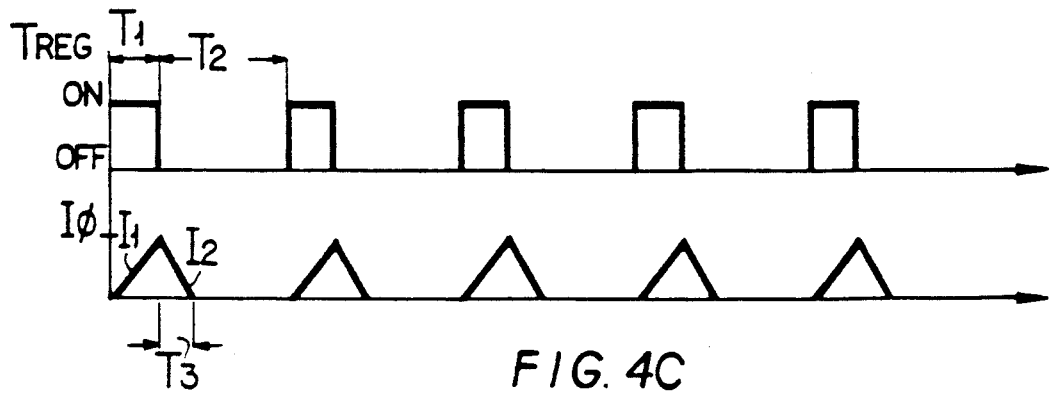

FIG. 4A shows the switch position and time duration for that switch position with the resultant profile of currents, $I_1$ and $I_2$, for a certain motor speed. FIG. 4B shows the switch position and time duration for that switch position with the resultant profile of currents, $I_1$ and $I_2$, for a slower motor speed. And FIG. 4C shows the switch position and time duration for that switch position with the resultant profile of currents, $I_1$ and $I_2$, for a faster motor speed.

It is clear from the above consideration that the duration of periods T1 and T2 are crucial. It has been found that at relatively low speeds T1 must be long to permit the current I1(t) to build up. The motor specified above has a time constant of about 14 msec, and hence T1 must be lower, but still in the millisecond range. If the final value of I1(t) is too small then the regeneration effect is negligible.

At high speeds, the current I1(t) builds up very fast and switch 78 cannot be left on for too long because the battery 18 may not be charged at very large current and because during period T1, the motor is shorted and may be damaged. Moreover, it was found that if T1 is too long, the recharge current is too large and the vehicle's movement may become jerky. Preferably, the peak value IO should not exceed 30–40A.

As previously mentioned, T2 should be larger than T3. Preferably, the total period T1+T2 should be about 3 to 5 msec. It has been found experimentally that if T1+T2 is 3 msec then T1 should be in the range between 0.6 msec and 2.3 msec. More specifically, the CPU 28 is used to generate the signal TREG by using the formula:

$$T1 = 2.3 - 6.8 \times 10^{-4} \times RPM \; msec$$

where RPM is the speed (in rotations per minute) of the motor 14 and is calculated by the CPU 28.

A prototype vehicle has been built using the motor mentioned above. This prototype has been tested and the Emf was measured at various speeds, and the values WM1, WM2, WB and Emf were calculated using the formulas described above. The results of these calculations are indicated in the following table:

| Motor Speed (RPM) | T1 (ms) | T3 (ms) | I0 (A) | Emf (V) | Wm1 + Wm2 (mJoule) | WB (mjoule) | Eff % |
|---|---|---|---|---|---|---|---|
| 200 | 1.9 | 0.2 | 6 | 25 | 157.5 | 172 | 109 |
| 500 | 1.8 | 0.5 | 14.5 | 62.5 | 1042 | 1044 | 100 |
| 1000 | 1.4 | 0.9 | 26.5 | 125 | 3809 | 3434 | 90.1 |
| 1500 | 1.2 | 1.3 | 30 | 187.5 | 7031 | 5616 | 79.9 |
| 1800 | 0.95 | 1.55 | 30 | 225 | 8437 | 6696 | 79.4 |

In this table the efficiency equals or exceeds 100% at 200 and 500 RPMs respectively. This is obviously erroneous and it is believed to result from using straight line approximations for currents I1 and I2. However, the table does illustrate that a very high efficiency can be expected from the disclosed invention ranging from better than 75% at high speeds to almost 100% at low speeds.

Of course, while the battery 18 is partially recharged using dynamic braking, the battery charger 20 is used as an additional charging means. The I.C.E. is operated independent of the speed of the vehicle thereby further improving the overall running distance of the vehicle.

The battery charger is used as a safety precaution to assure that the battery 18 is charged due to is capacity at all times. In fact, during testing of the prototype it was found that the system would run well even without a battery charger.

To insure that the battery 18 is not overcharged, the battery voltage is constantly monitored by a battery monitor 90 (FIG. 1). If the voltage exceeds the rating of the battery, the battery charger is disconnected.

The dynamic braking applied by the power circuit 38 slows down the vehicle rapidly at high speed. At very low speed it may be insufficient to provide sufficient braking power to stop the vehicle completely. Therefore, a standard hydraulic braking system (not shown) is also provided which is also activated by the brake pedal 80.

Obviously numerous modifications may be made to this invention without departing from its scope as defined in the appended claims.

We claim:

1. A motor vehicle drive system comprising:
   vehicle wheels;
   a motor coupled directly to said vehicle wheels;
   a battery for providing driving current to said motor;
   speed sensing means for sensing the speed of said motor and generating a speed signal; and
   control means for operating said motor in an actuating mode during which said motor applies primary motive power to said wheels and in a regenerative mode in which said motor acts as a generator to convert the kinetic energy of the vehicle into electrical energy by generating a regenerative current, said control means receiving said speed signal and including switching means for shorting said motor for a first period during which said regenerative current is built up, said control means changing said first period in response to said speed signal to control a peak value of said regenerative current, said switching means discharging said regenerative current for a second period through said battery.

2. The system of claim 1 wherein said motor is a brushless DC motor.

3. The system of claim 1 wherein said control means changes said first period linearly with respect to said speed signal.

4. The system of claim 1 wherein said first period is decreased by said control means as said speed is increased.

5. A motor vehicle drive system comprising:
   vehicle wheels;
   a brushless dc motor coupled to said wheels for providing primary motive power to said wheels, said brushless dc motor including a plurality of coils;
   speed sensing means for generating a speed signal indicative of the speed of said motor;
   a battery for providing driving current for said motor;
   power control means including a first set of power switches each switch having a diode in parallel therewith, cooperating to form a power converter for said coils, and a second set of switches responsive to control signals for operating said motor, wherein said motor is operated in an actuating mode during which first set of power switches are closed in a predetermined sequence to energize said coils and wherein said motor converts electrical energy from said battery into mechanical energy for said wheels, and a regenerative mode during which all said first set of switches are open and said motor is transformed into a generator and converts the kinetic energy of said vehicle into electrical energy by generating a regenerative current switched by said second set of switches and said diodes to said battery, wherein said regenerative mode includes a first period during which said coils are isolated from said battery and said regenerative current builds up towards a peak value, said control means changing the duration of said first period in response to said speed signal to control said peak value, said first period being alternated with a second period during which said coils are connected to said battery to discharge said regenerative current.

6. The system of claim wherein said second set of switches cooperate to shunt said motor for said first period, and direct said regenerative current to said battery for said second period for recharging.

7. The system of claim 5 wherein said first period is linearly dependent on said speed signal.

8. The system of claim 5 wherein said switches are MOSFETS.

9. The system of claim 5 further comprising a separate battery charger.

10. The system of claim 9 wherein said separate battery charger includes an internal combustion engine set for operating at a constant speed independent of the speed of said vehicle and a generator coupled to said engine.

11. The system of claim 9 further comprising voltage monitoring means for monitoring a voltage of said batter, said monitoring means being arranged to decouple said separate battery charger from said battery if said voltage exceeds a nominal rating.

12. A motor vehicle drive system comprising:
a plurality of wheels;
a multiphase dc brushless electric motor including a plurality of interconnected coils;
a battery having two terminals;
a first and a second bus, each bus being coupled to one of said terminals;
a set of excitation switches for selectively connecting said coils to said buses, each said switch excitation being provided in parallel with a respective diode;
a set of control switches, including a series switch connected in series between one of said terminals and one of said buses and a parallel switch connected across said buses;
speed sensing means for sensing a speed of said motor; and
a control circuit for operating said motor through said control and excitation switches, said control circuit operating said motor in an actuation mode in which said excitation switches connect each of said coils in a preselected sequence to said buses, said parallel switch is open and said series switch is periodically closed to turn said motor in a preselected direction at a preselected speed;
said control circuit further operating said motor in a regenerative mode in which the motor vehicle is slowed down by converting kinetic energy of the vehicle into electrical energy for storage in said battery, in said regenerative mode said excitation switches and said series switch being open, said parallel switch being closed for a first period to short said buses to each other, wherein said coils generate a regenerating current circulating through said diodes between said buses and said coils until said regenerating current reaches a peak value; said parallel switch being opened during a second period during which said regenerative current flows to said battery for recharging, said first and second periods continuously alternating during said regenerative mode;
wherein said first period is varied by said control circuit inversely with respect to said speed to control said peak value.

13. The motor vehicle drive system of claim 12 wherein said first and second periods define a total period equal to the sum of said first and second periods, said total period being constant and independent of said speed.

14. The motor drive system of claim 13 wherein said motor has a characteristic time constant of 14 msec and said total period is in the range of 3-5 msec.

15. The motor drive system of claim 13 wherein said diodes are arranged to provide a rectifier bridge between said coils and said buses during said regenerative mode.

* * * * *